INVENTOR
ROGER C. JOUVENEAUX

United States Patent Office 3,443,565
Patented May 13, 1969

3,443,565
GRAIN THRESHING, CLEANING AND SEPARATING DEVICE
Roger Charles Jouveneaux, Mouvaux, France, assignor to International Harvester Company, Chicago, Ill., a corporation of Delaware
Filed Feb. 2, 1967, Ser. No. 613,488
Claims priority, application France, Feb. 9, 1966, 49,022
Int. Cl. A01f 7/00, 12/20
U.S. Cl. 130—27
7 Claims

ABSTRACT OF THE DISCLOSURE

A grain cleaner awner and tailings recleaner having a pair of concentric auger conveyors that process the uncleaned grain and tailings and centrifugally discharge the processed material into an air current that carries away the chaff and dust. The pair of augers and the fan producing the air current are all driven from a single rotary drive.

Background of the invention

The present invention relates to a grain cleaner awner and tailings recleaner for a harvester thresher.

Among the duties, which are expected of a harvester-thresher, those of a first group, viz, cutting and separating the straw from the grain contained in the ears, constitute a first basic operation, those of a second group, viz, cleaning and sorting and continuing as far as bagging, constitute a second finishing operation.

In the prior art, however, the same machine strikes and cuts the sheaves, feeds the grain pan and the straw shaker, draws away the dust and short straw, gathers the tailings and recycles them, and finally discharges a cleaned and sorted product into the grain tank.

It is obvious that such numerous and various functions imposed on the design of a vehicle which moves over all types of ground to gather the crop, lead at first to the construction of an apparatus in which the circuit for the materials is complicated, unwieldy, difficult to adjust for unspecialized personnel, and which, in any case, does not permit operations such as polishing and awning.

The is a tendency nowadays to use special apparatus for carrying out part of the said second finishing operation independently of the threshing machine itself.

In general, these apparatus have an essential feature, that is instead of comprising, as is the case with the conventional combine-harvester, a circuit for the material developed over a certain path, which may be more or less long and with a greater or lesser number of stages and with unwieldy trough screens and elevators, they are compact apparatus constructed about a symmetry axis, the circuit of the material being essentially centrifugal or centripetal and with controlled downward or upward advance. Reference may be made to the patent to Metcalf, No. 2,275,392, of Mar. 3, 1942, for disclosure of a device of this type.

Up to now, however, compact embodiments of combine-harvester cleaners of cylindrical form have not been able to ensure the totality of the functions which should be expected if these compact cleaners are to advantageously take the place of all the additional members provided on a complete combine-harvester, after the threshing operation proper.

These compact prior art machines generally have this in common, that they enclose within a cylindro-conical body an axial driving shaft driving a blowing fan, feed conveying ramps, grain-spreading turbines and a sorting screen.

Moreover, there are two special difficulties which have to be overcome when designing a really complete and improved apparatus:

(a) Ensure continuous recycling of tailings
(b) Ensure simultaneous polishing and awning of grain if necessary;
(c) Ensure satisfactory distribution of grain and regular operation even in case the vehicle carrying the apparatus is inclined.

Summary

The present invention provides a simple, compact grain cleaner for a harvester thresher that processes and returns the tailings to the cleaning circuit and in addition polishes and awns the grain. The invention relies upon the principle of centrifugal and centripetal forces and thus it's operation is not inhibited by the inclination of the supporting vehicle. All moving parts of the device receive their drive from a single rotary source.

Description of the preferred embodiment

The present device is constructed about a vertical screw 1.

Figure 1:
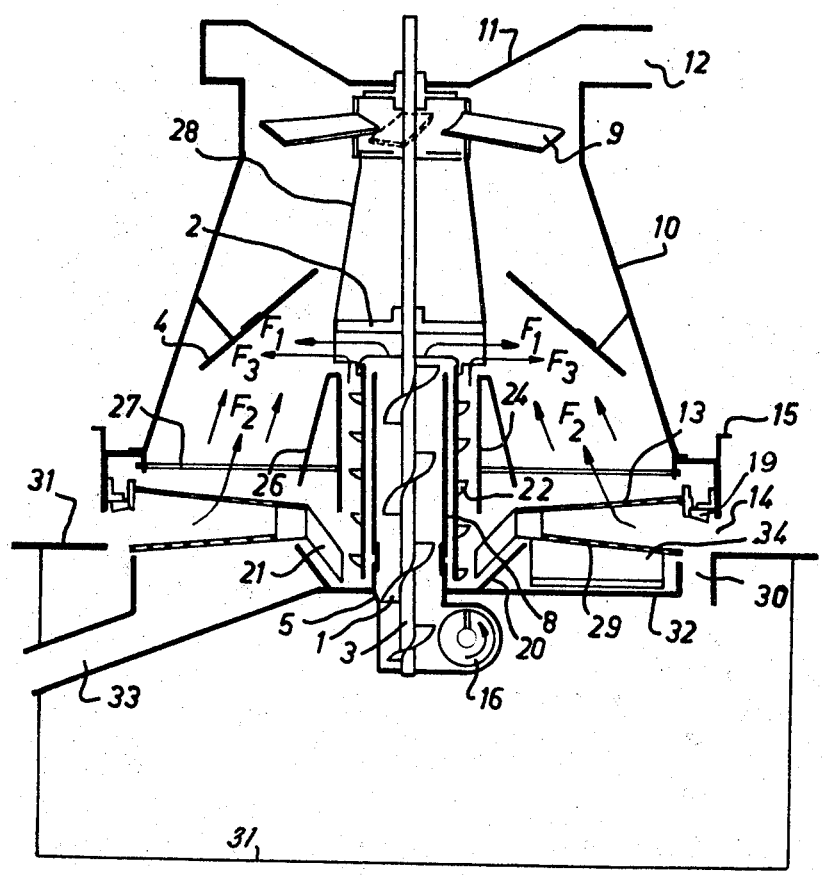
FIGURE 1 is a cross-sectional view of an apparatus according to the invention.
Figure 7:
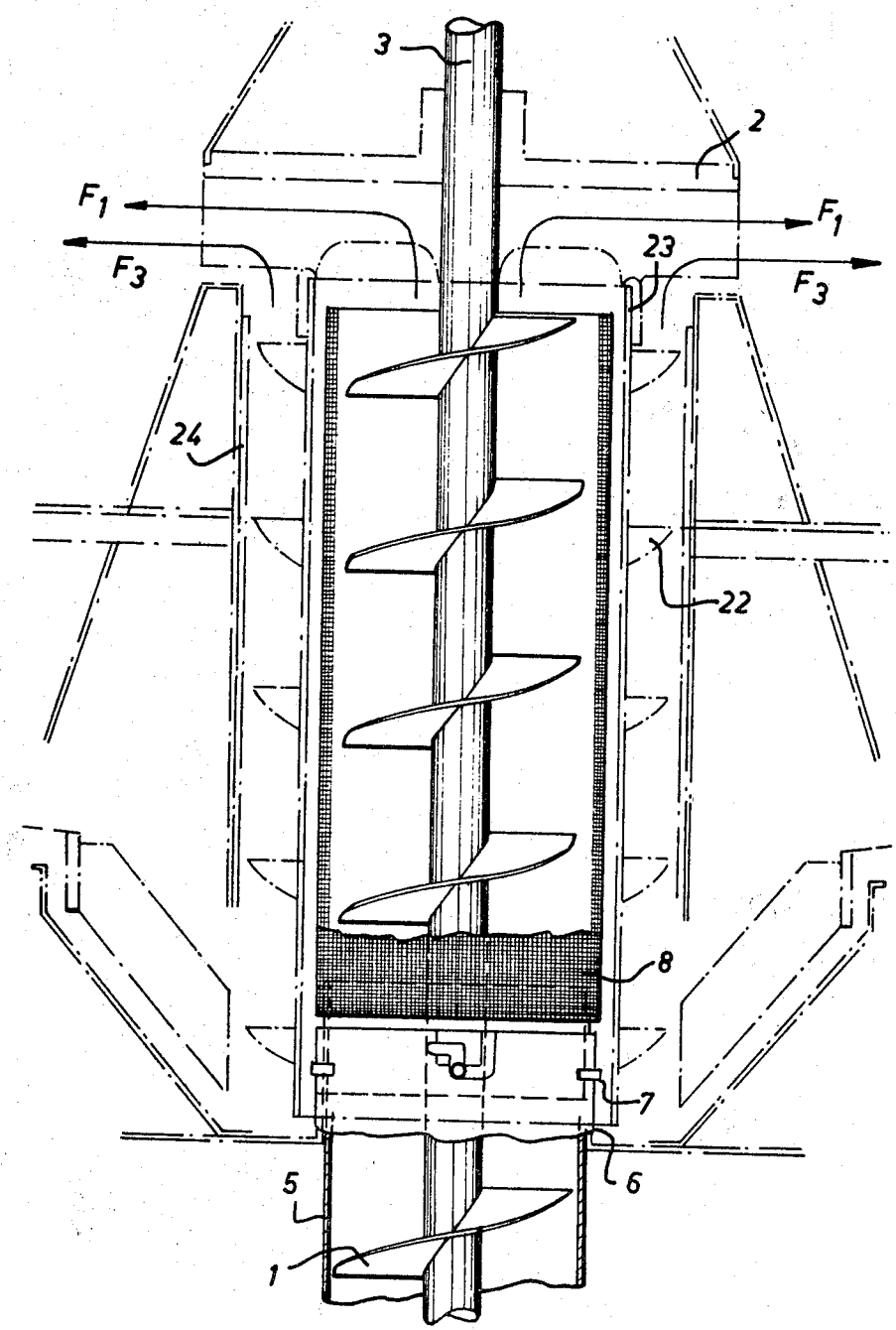
FIGURE 7 is a partial sectional view of the awner or grain polisher.

The vertical screw 1 feeds a turbine 2 keyed to a shaft 3 driven by any known means (not shown) and projects the mixture to be cleaned in a horizontal layer according to arrows F1 onto a frusto-conical deflector 4. This vertical screw rotates inside the smooth sheet-metal tube 5 which ends at 6 in an end piece provided with lugs 7 onto which is locked (when needed) a cylinder 8 of rough surfaced sheet-metal or awning mesh that functions to polish or awn the grain (FIGS. 1 and 7).

This polishing or awning operation is carried out by a rubbing action and, as screw 1 rotates at high speed, by the grain being projected by centrifugal force against the rough wall of cylinder 8.

A helical fan 9 is arranged in the upper portion of the body or housing 10 of the apparatus; it is fixed to the main shaft 3 and disposed in a casing 11 comprising an outlet 12 to facilitate discharge of the light portions which are sucked up by this fan during operation of the apparatus.

Figure 2:
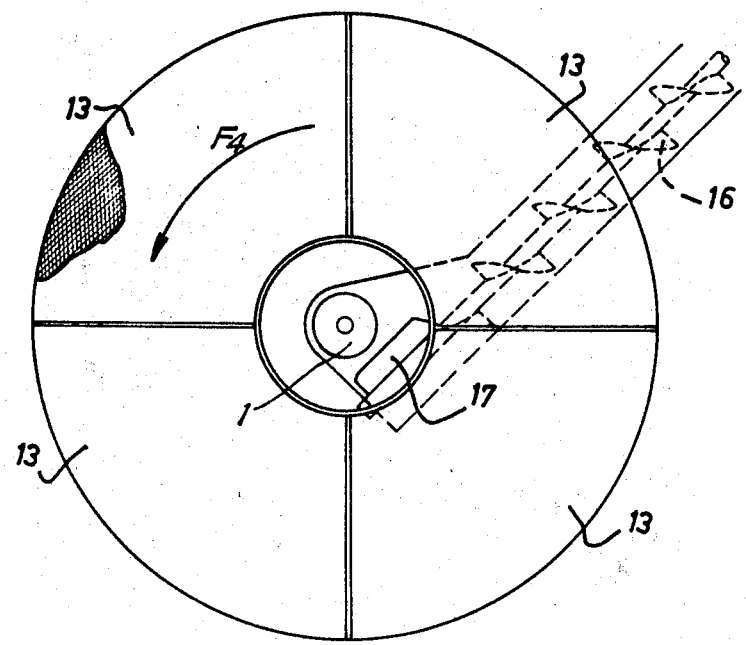
FIGURE 2 is a plan view showing the upper separation grid and a detail of the feed system of the apparatus.
Figure 3:
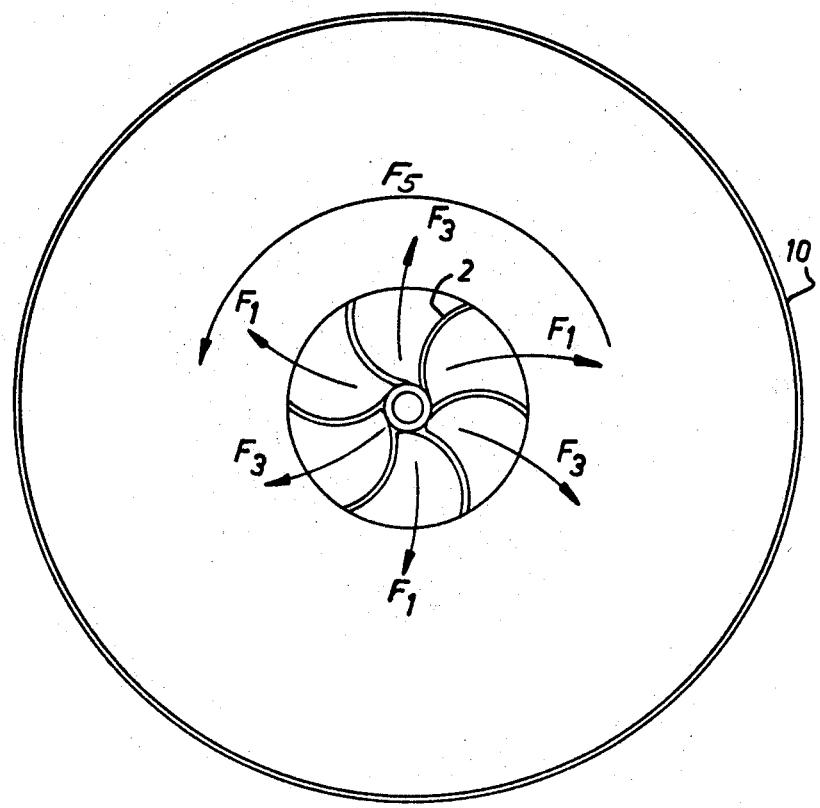
FIGURE 3 is a plan view of the turbine which injects the mixture to be cleaned into the apparatus.

A sieve or grid 13 forms the bottom of the body of the device. This grid has the shape of a frustum of a cone coaxial with the said body, the apex of this frustum of a cone being at its lower portion. This grid is formed in several sections, four for instance, which can be taken down and replaced by sections with different perforations, acording to the crops being treated (FIG. 2). It rotates about the central axis on rollers 19 and is actuated by known means (not shown).

Circular apertures 14 are provided in the base of the body to admit air under the grids 13 to complete cleaning and raise the light particles (chaff, short straw) lying on the grid.

These apertures 14, or air intakes, may be varied by closing the said apparatus to a greater or lesser extent by means of shutters 15, in order to lessen the amount of air rising as shown by the arrows F2 when the apparatus is used for very light grains.

The vertical screw 1 is fed with the mixture to be sorted by another screw 16 disposed perpendicularly and preferably tangentially with respect to the first, one particularity of which is that the strip 17 of material forming the screw ends in the form of a blade so as to throw the mixture to the center of the screw 1, thus facilitating its transfer (FIG. 2).

Figure 4:
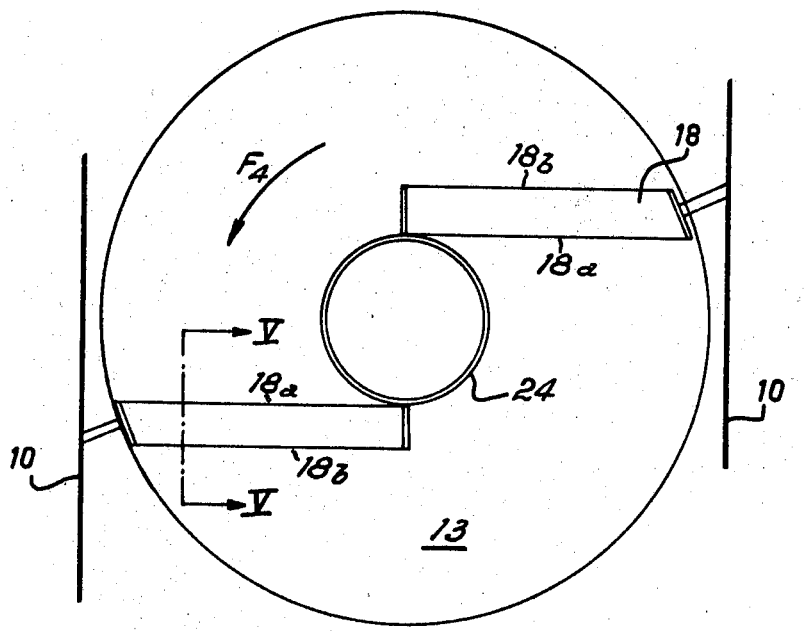
FIGURE 4 is a plan view showing the position of the scrapers on the separation grid.

Scrapers 18 of suitable shape, disposed on the grid 13 tangentially of its circular centered aperture, are rigidly fixed to the lower portion of the cylinder 24 and of the body of the apparatus 10 (FIG. 4).

Figure 5:
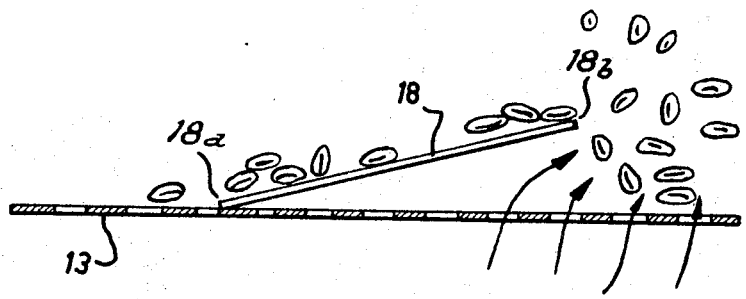
FIGURE 5 is a view according to V—V of FIGURE 4.
Figure 6:
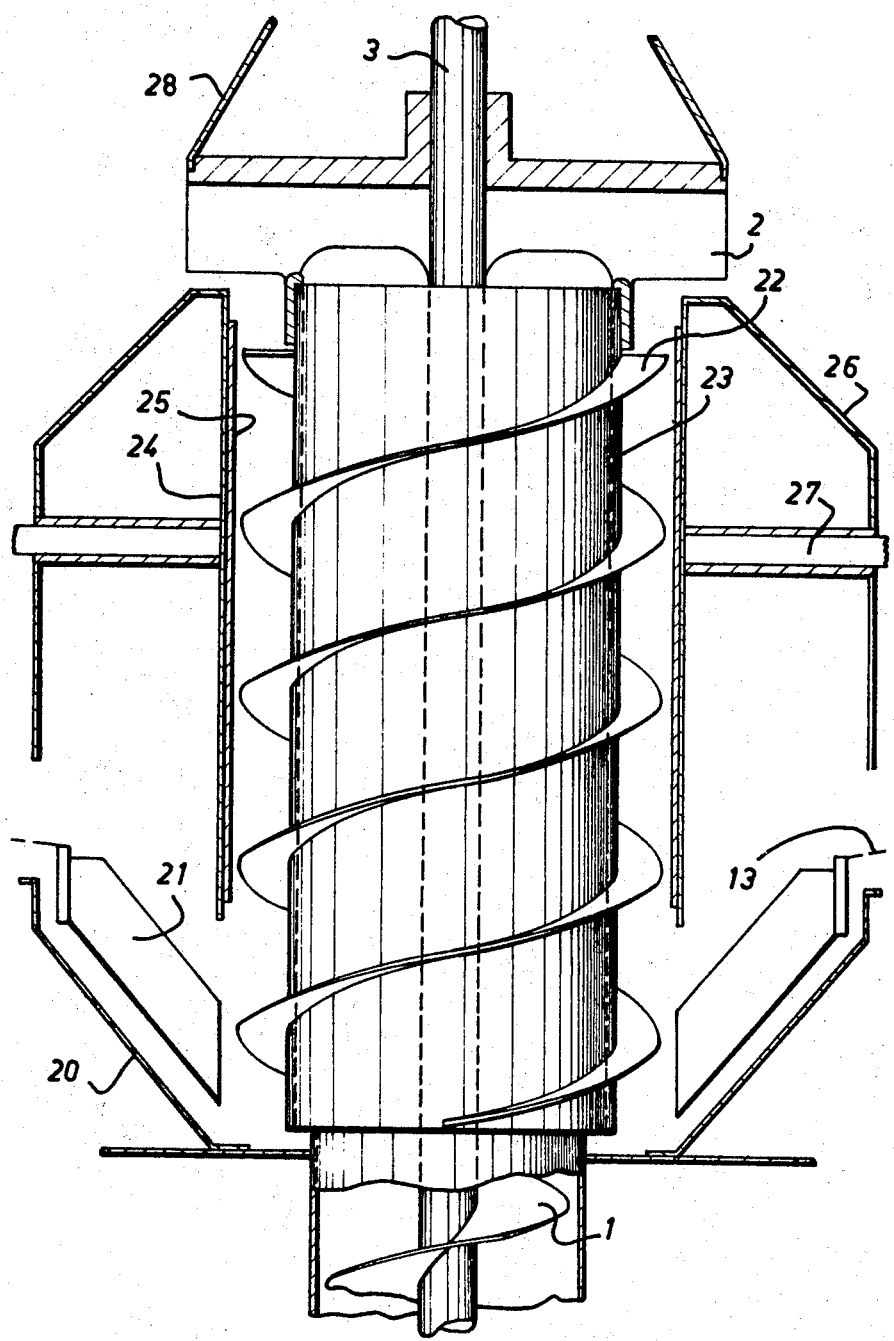
FIGURE 6 is a partial sectional view of the tailings grinder.

The scrapers 18 are disposed at a certain slope with respect to grid 13, the side 18a being nearer to said grid than side 18b (FIG. 5) to help the grain to pass through the grid by spreading it before the side 18a of the scraper and also to guide the tailings situated on the grid towards the central collector 20. Owing to the rotation and the slope of grid 13 the tailings have a tendency to move towards the center of the apparatus.

Also because of the rotation of grid 13 as shown by the arrow F4, this slope causes the grain which is on the grid and has not passed through it and still has light particles retained in it to move onto the scraper; the said grain falls behind side 18b of the scraper and during its fall, the light portions are released from the grain and are sucked up by the ascending air current. The grain which falls on grid 13 continues to rotate with it and is again stopped, should it so happen, by the following scraper.

The portion adapted to thresh the tailings stopped by the grid 13 and scraper 18 consists of a stationary annular bowl 20 placed beneath the central aperture of the said grid.

Preferably helical inclines sweep the inner surface of the bowl 20. They are rigidly fixed to the grid 13 and rotate with it. These inclines cause the tailings to move into the crusher. This crusher consists of an endless screw 22 wound around a supporting tube 23 and disposed vertically above the bowl 20. It is secured at the top to the turbine 2 which drives it in the direction of arrow F5 owing to the fact that the latter is rigidly fixed to shaft 3. The screw 22 therefore permits the tailings discharged in the direction of the arrow F3 to be projected outwards. The turbine 2 also acts as injector to project the mixture of grain, straw and impurities coming from the screw 1 in a layer according to F1 (FIGS. 1, 3, 6 and 7).

The endless screw 22 rotates inside a cylinder 24 whose inner wall is roughened by the addition of a sheet of perforated or expanded metal 25.

This cylinder is capped by a cylindro-conical deflector 26 extending slightly over the inner edge of the grid 13.

Four tie-rods 27 are disposed between the cylinder 24 and the body to maintain cylinder 24 rigid inside the apparatus.

A frustum of a cone 28 caps the turbine 2 and extends under the fan 9 to avoid turbulence which would be harmful to the satisfactory operation of the apparatus.

Beneath the grid 13, and rotating with it, is another grid 29 whose perforations are smaller than those of grid 13. This grid has a frusto-conical shape, the apex of this frustum of a cone being directed upwardly.

This grid acts as a deflector and forces the grain to flow towards the apertures 30, which are the inlets to the grain tank 31. It also acts to correctly direct the streams of air which enter through the circular aperture 14.

A flat-bottomed hopper 32 ending in a conduit 33 is disposed beneath this grid 29, to cause the small and broken grains which have passed through the grid 29 to slide into an additional sack provided for them. A scraper 34 secured beneath the grid 29 forces the grains to fall into the conduit 33 at each rotation of the grid.

The operation of a sorter according to the invention will now be described.

The helical fan 9 rotates and produces a suction through the body 10 of the sorter, this suction being evenly distributed, according to the adjustment provided, between the circular aperture 14 at the base of the body and casing 11 disposed at its upper portion.

The streams of air flowing along the frustum of a cone 29 pass through grid 13 and are directed between body 10 and frustums of cones 26 and 28 and finally flow out through the outlet 12.

The mixture of grain and waste products introduced by the screw 16 into the vertical screw 1 passes into the turbine 2 which projects it in a horizontal layer as shown by arrows F1; its movement is transformed by reason of gravity and by reaction against the deflecting wall 4 into a downward helical movement.

Owing to the friction on the cone 4, the speed of the mixture lessens until the heavy and light portions can separate, the latter being sucked in by the fan; the others, that is the grain and the tailings fall on the grid 13. The light impurities are discharged through outlet 12 of the casing 11 surrounding the fan 9. The grain passes through grid 13 and falls onto the second grid 29 where grading takes place. The whole grains slide on the grid 29 and fall through the apertures 30 into the grain tank 31; the small and broken grains pass through this grid 29 and then fall into the flat-bottomed hopper which leads them through conduit 33 into an additional sack adapted to receive them.

The heavy products which cannot pass through grid 13 and which constitute the tailings are moved towards the center of the grid by means of its frusto-conical shape and its relative movement with respect to the scrapers 18; they fall into the annular bowl 20 and the helical inclines 21 drive them by rotation towards the bottom of the bowl where they are taken up by the endless screw 22.

The endless screw 22 draws the tailings vertically towards the turbine 2 which is constantly in action to crush the mixture of grain coming from the screw 1.

In this movement, the tailings undergo efficient threshing owing to the rough nature of the inner wall of the cylinder 24 and the high rate of rotation of the main shaft 1.

Therefore, after having been perfectly threshed a second time, the grain from the tailings will again be projected by the turbine 2 in a horizontal layer F3 to undergo a new cleaning cycle similar to the cycle already described, for as many times as this may be necessary.

It is seen that, upon its introduction by screw 1 and conduit 5, the grain is awned by friction and by projection by centrifugal force against the rough wall of cylinder 8. This portion of the apparatus forms the awner.

It is seen that the apparatus according to the invention is a compact apparatus in comparison with the conventional sorters of an old type thresher, which takes up very much less space and is economical to build.

With respect to other compact prior art apparatus, it is self-contained and complete and combines four apparatus about its axis; the cleaning unit, the installation for gathering the tailings and returning them to the thresher, the sorter-grader and the awner-polisher, and this without in any way being influenced by the slope of the ground which often causes heavy loss of grain in conventional machines.

It is understood that the preceding description has been given purely by way of explanation and that alterations of detail consistent with its spirit can be made thereto without departing from the scope of the invention.

What is claimed is:

1. A grain separating device for a harvester thresher comprising:
   a housing;
   a rotary vertical shaft having upper and lower end portions and journalled centrally of said housing;
   a first feed screw secured to the lower end portion of said shaft;

a first stationary cylinder surrounding said feed screw, said first feed screw and stationary cylinder dimensioned such that upon rotation of the first feed screw material is elevated through the first cylinder and discharged through its upper end;

a turbine carried by said vertical shaft above the first feed screw and stationary cylinder for throwing the elevated material radially of said vertical shaft;

a fan carried by the upper end portion of said vertical shaft for creating an updraft of air;

an annular deflector supported by said housing and spaced from said vertical shaft in horizontal alignment with said turbine;

a first rotary grid supported by said housing, said first grid having an annular frusto-conical shape and arranged such that its concavity faces upwardly, said first rotary grid located below said turbine to receive deflected material therefrom;

a second stationary cylinder concentric to and larger than said first stationary cylinder;

a second feed screw connected to said vertical shaft and located between said first and second stationary cylinders such that it receives the tailings material from said first rotary grid that is moved centrally without passing through the grid, said stationary cylinder and second feed screw being dimensioned such that upon rotation of the second feed screw there is grinding action of the tailings material against the inner surface of the second stationary cylinder and said tailings material is discharged into said turbine;

a second rotary grid supported by said housing below said first rotary grid, said second grid having an annular frusto-conical shape and arranged such that its concavity faces downwardly; and clean grain collecting means located below said second rotary grid.

2. The invention as set forth in claim 1 wherein said turbine and said fan are connected by a conical hood.

3. The invention as set forth in claim 1 wherein an annular bowl having an upwardly facing concavity is secured to said first stationary cylinder such that it receives the tailings material from said first rotary grid.

4. The invention as set forth in claim 1 wherein a plurality of stationary scrapers supported by said housing are cooperatively located over said first rotary grid to agitate the material carried thereon.

5. The invention as set forth in claim 3 wherein helical inclines are carried by said first rotary grid extending into said bowl such that the tailings material is driven toward said second feed screw.

6. The invention as set forth in claim 3 wherein a plurality of stationary scrapers supported by said housing are cooperatively located with said first rotary grid to agitate the material carried thereon.

7. The invention as set forth in claim 6 wherein helical inclines are carried by said first rotary grid extending into said bowl such that the tailings material is driven toward said second feed screw.

References Cited

UNITED STATES PATENTS

| 2,880,734 | 4/1959 | Edstrom | 130—27 |
| 2,905,182 | 9/1959 | Wise | 130—27 |

FOREIGN PATENTS

| 1,230,810 | 9/1960 | France. |

ANTONIO F. GUIDA, *Primary Examiner.*